March 16, 1943.  A. B. WELTY  2,314,259
HARVESTER-THRESHER
Filed Dec. 23, 1939  2 Sheets-Sheet 1

Inventor
Albert B. Welty
By Paul O. Pippel
Att'y.

March 16, 1943.  A. B. WELTY  2,314,259
HARVESTER-THRESHER
Filed Dec. 23, 1939   2 Sheets-Sheet 2

Inventor
Albert B. Welty.
By Paul O. Pippel
Att'y.

Patented Mar. 16, 1943

2,314,259

UNITED STATES PATENT OFFICE 2,314,259

HARVESTER-THRESHER

Albert B. Welty, Moline, Ill., assignor to International Harvester Company, a corporation of New Jersey Application December 23, 1939, Serial No. 310,698

3 Claims. (Cl. 130—27)

This invention relates to a harvester thresher. More specifically it relates to a variable speed transmission device for driving the cylinder of the thresher.

In the operation of a harvester thresher, the cylinder is required to be driven at different speeds depending upon the crops being threshed. Normally the change in speed is had by the use of a pulley of a different size connected to the drive of the cylinder. It can be easily seen that the detachment of the one pulley and substitution of another is a tedious and time-consuming operation. Under the present invention change in the speed of the cylinder is accomplished without the substitution of one pulley for another.

An object of the present invention is the provision of an improved harvester thresher.

Another object is the provision of a harvester thresher in which the cylinder of the thresher may be driven at different speeds.

A further object is the provision of an improved speed transmission device.

Still another object is to provide a novel supporting means for a pulley constituting a variable speed transmission device.

According to the present invention, a source of power for driving the parts of the novel harvester thresher originates with a drive shaft mounted on the draw frame of the harvester thresher and driven by a tractor. Drive from the drive shaft to the threshing cylinder is transmitted through three pulleys and a pair of belts, one of the pulleys being composed of adjustable sections in engagement with the two belts. The latter pulley is supported on members which permit easy bodily shifting of the pulley, by which shifting the variation in the speed of the cylinder is effected.

Figure 1:
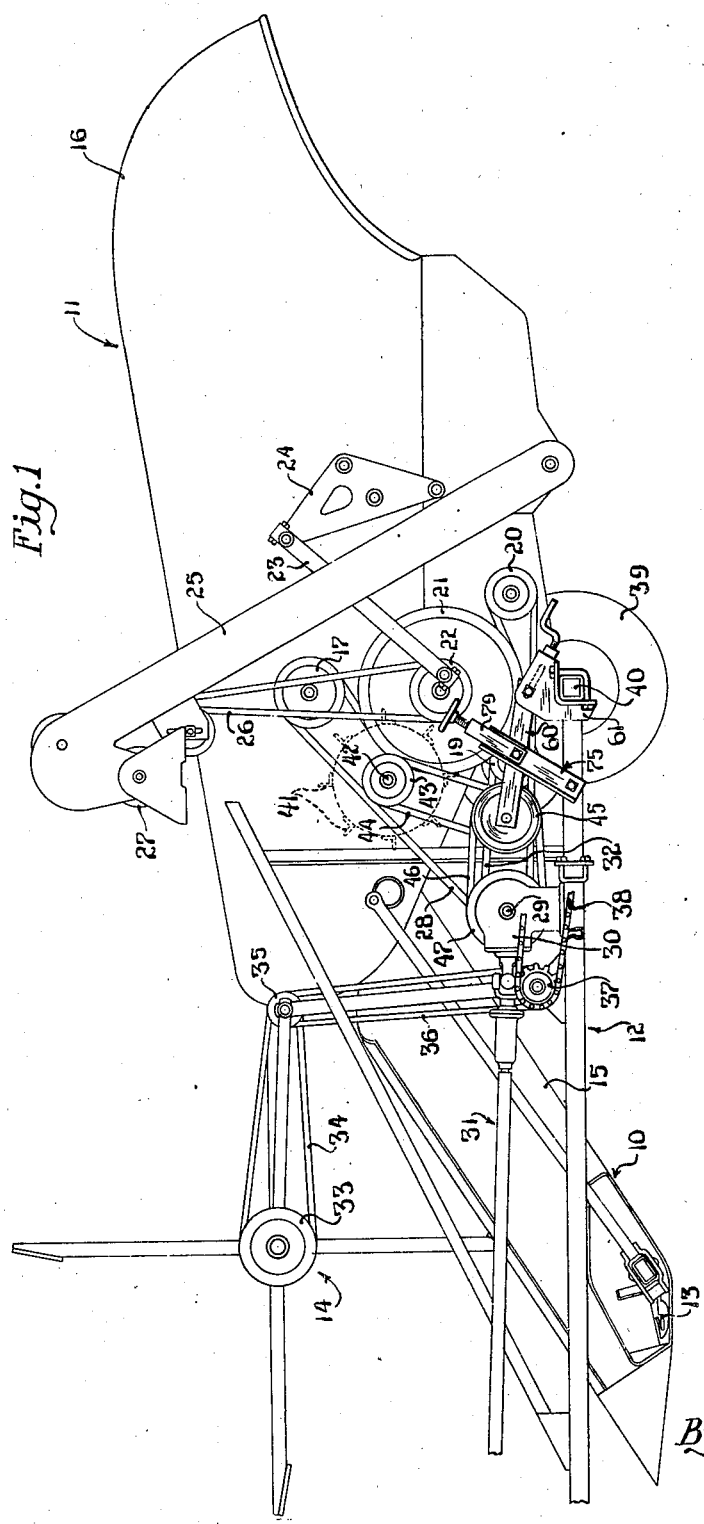
Figure 1 is a side view of the harvester thresher of the present invention.

The harvester thresher of the present invention comprises essentially a harvester part 10, a thresher part 11, and a draw frame 12. The harvester part includes the usual reciprocating cutter 13, reel 14, and support 15 for a conveyor, not shown. The thresher part 11, which is positioned immediately behind the harvester part 10, includes a shell 16 and various elements such as a beater, a fan, and a shaker, which are not shown since they form no part of the present invention. However, means by which these various parts are driven is shown. A pulley 17 for the beater is positioned on the outside of the shell. Likewise, a pulley 19 for the fan, idler pulley 20, shaker shaft pulley 21, and pulley 22 driven by the shaker shaft pulley 21 and serving as a crank for a connecting rod 23 connected in turn to a bell crank 24 serving to shake the shaker.

A grain elevator 25 is secured to the outside of the shell 16 and is driven by a belt 26 in engagement with the pulley 22. The belt 26 also drives the grain auger 27. The pulleys 17, 20, and 21 are driven by a belt 28, in turn driven by a pulley, not shown, secured to a shaft 29 of a gear box 30 mounted upon the draw frame 12 and driven by a shaft 31 adapted to be connected with a tractor, not shown. The pulley 19 for the fan is driven by a belt 32, driven in turn by another pulley, not shown, mounted upon the shaft 29. Drive of the reel 14 is had by a pulley 33, belt 34, pulley 35, belt 36, sprocket 37, and a sprocket chain 38 adapted to be connected for drive by a wheel 39. The wheel 39 is one of a pair of wheels, which is supported by an axle 40, to which the draw frame 12 is secured, and upon which the harvester part 11 is mounted.

Figure 3:
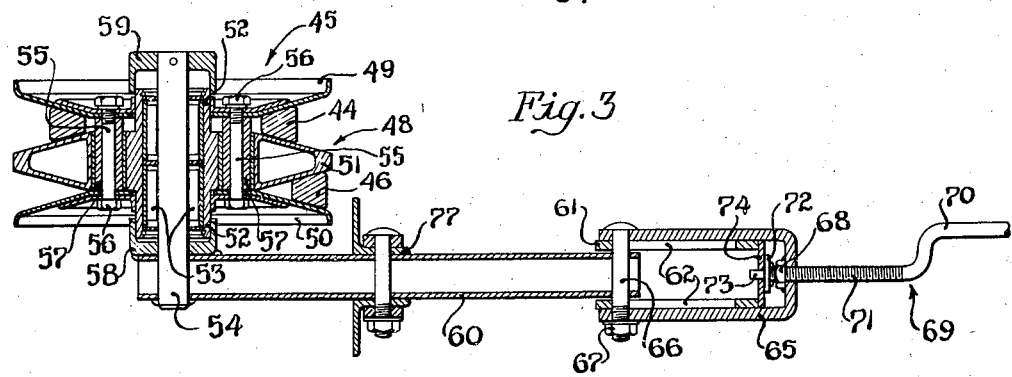
Figure 3 is a section taken along the line 3—3 of Figure 2.

The thresher part 11 has a cylinder, of which the rub bars 41 are shown in dotted lines. The cylinder is mounted upon a shaft 42, upon the end of which is secured a pulley 43. A belt 44 is in engagement with the pulley 43 and with a pulley 45. A belt 46 engages the pulley 45 and a pulley 47 secured to the shaft 29 in the gear box 30. The pulley 45 is shown in detail in Figure 3 and comprises a middle section 48 and similar outer sections 49 and 50. The middle section 48 has an outer flange portion 51 of V-section, and a cylindrical portion 52 is mounted upon roller bearings 53 in turn mounted upon a shaft 54. The outer sections 49 and 50 of the pulley are secured against relative movement with respect to one another by means of bolts 55, nuts 56, and spacing sleeves 57. The bolts and sleeves extend through the middle section 48 of the pulley and permit an axial movement of the outer sections 49 and 50 with respect to the middle section 48 and prevent rotational movement of the outer sections 49 and 50 with respect to the middle section 48. Cup-shaped members 58 and 59 retain the pulley 45 upon the shaft 54, which is secured, as by soldering or welding, at one end of a rectangular tubular section 60. A bracket 61 embraces the other end of the member 60 and has elongated slots 62 formed therein. The bracket is secured to the axle 40 by means of a bolt 63 and nuts 64. A U-shaped member 65 embraces the bracket 61 and is secured to the end of the member 60 by a nut 67 and a bolt or pin 66 passing through the members 60 and 65 and the slots 62 in the brackets 61. A nut 68 is secured to the base of the U-shaped member 65. An adjusting screw 69 has a crank portion 70, a threaded portion 71, a shoulder 72, and an end portion 73. The threaded portion 71 is in threaded engagement with the nut 68. The end 73 extends through an opening in a part 74 abutting or secured to the bracket 61, the shoulder 72 abutting the part 74. A U-shaped member 75 is pivotally connected to the draw frame 12 by means of a bolt 76. The U-shaped member 75 has flanged legs 77 which embrace a mid-portion of the member 60. The legs 77 have slots 78 therein. A U-shaped member 79 embraces the member 75 and has a nut 80 secured in the base 81 thereof. An adjusting screw 82 has a threaded portion 83, an enlarged portion 84 at one end permitting hand adjustment of the screw, and shoulder portions 85 and 86 at the other end 87. The threaded portion 83 is in threaded engagement with the nut 80. The shoulders 85 and 86 provide a rotatable connection of the end 87 of the adjusting screw with the base of the U-shaped member 75. A pin or bolt 88 passes through the members 60 and 79 and the slots 78 in the members 75. A nut 89 is secured to the end of the bolt 88.

Figure 2:
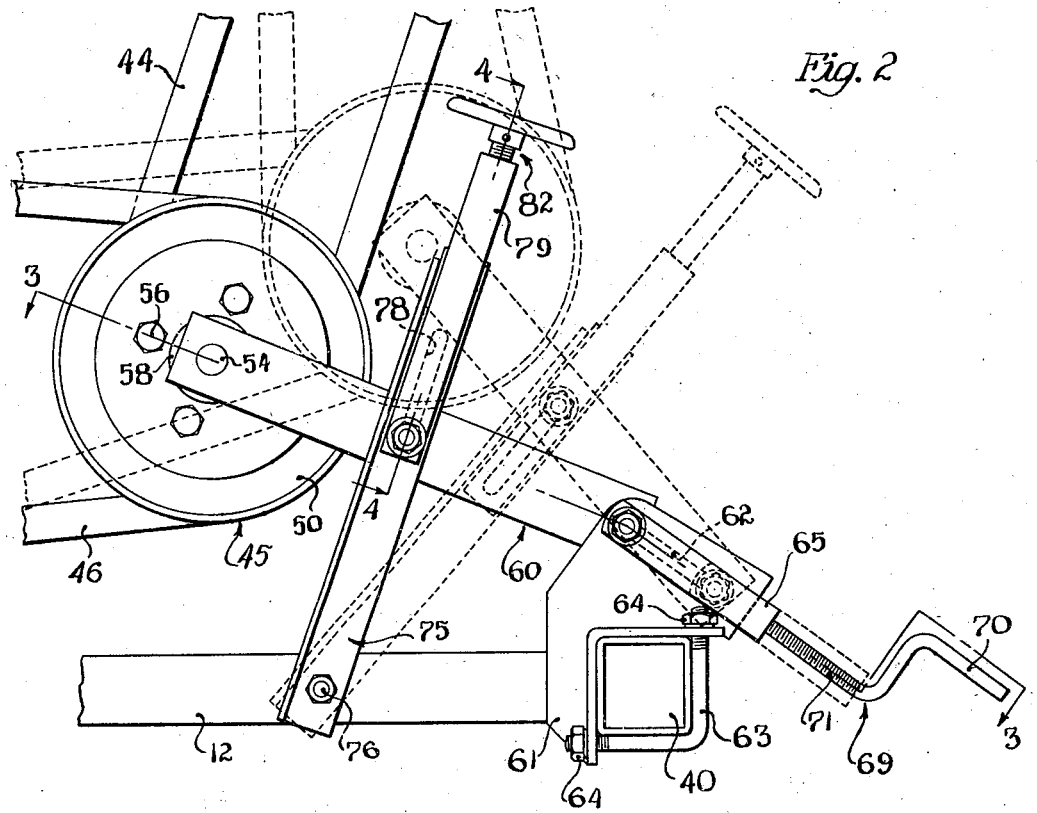
Figure 2 is a side view showing in detail the adjustable pulley and the members supporting it.
Figure 4:
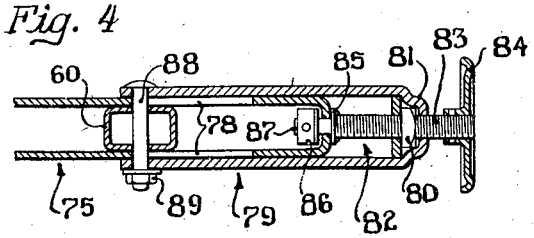
Figure 4 is a section taken along the line 4—4 of Figure 2.

Operation of the harvester thresher is in the usual manner. The tractor, not shown, operating through the draw frame 12 moves the harvester thresher over the ground, and crops are gathered by the harvester part 10 and conveyed for threshing to the thresher part 11. It will be seen that the various parts, such as the beater, shaker, and fan, are driven at a speed constantly proportional to the speed of the drive shaft 31 because of the driving connection of the various pulleys with the drive shaft 31 through the belts 28 and 46. The cylinder of the thresher part, however, may be driven at a speed which varies for any one speed of the drive shaft 31 because of the pulley 45. When the pulley 45 is in the full line position of Figure 2, the spacing of the pulley is such that the belt 46 contacts the pulley at the largest diameter possible, and the belt 44 contacts the pulley at a much smaller diameter. The reason for this may be seen from Figure 3. As seen in this figure, the pulley sections 48 and 50 are as close to one another as possible, and consequently the belt 46 is at the largest possible diameter. The sections 48 and 49, however, are separated as far as possible, and, consequently, the belt 44 is at the minimum diameter. In the dotted line position of Figure 2, the diameters at which the belts 44 and 46 contact the pulley 45 are reversed. In this position, the sections 48 and 49 of the pulley are as close to one another as possible, and the sections 48 and 50 are separated as much as possible. Shifting of the pulley 45 from the full line position to the dotted position is effected through the adjusting screw 82. The screw is turned so as to bring the base of the U-shaped member 75 as close to the base of the U-shaped member 79 as possible. This causes a pin 87 to be moved to the opposite end of the slots 78 from that shown in Figure 4. Thus the member 60 is moved toward the base end of the member 75, and the pulley 45 is swung to the dotted line position. As is evident by comparison of the full line and the dotted line positions of the member 60, the end of the member 60, to which the member 65 is attached, has been moved to the right so that the proper tension is maintained on the belts. This is effected by an adjustment of the screw 71 so that the space between the base of the member 65 and the part 74 with the bracket 61 is increased to a maximum from the spacing shown in Figure 3. That causes the bracket 65 to move to the right and with it the end of the member 60, because of the connection of the members 60 and 65 by the pin 66.

It will be seen from the foregoing description that a novel harvester thresher has been provided by which various parts of a thresher are driven at a constant speed with relation to the drive shaft, and the cylinder is driven at a variable speed so that the thresher adapts itself easily to crops of various kinds. The driving connection between the drive shaft and the threshing cylinder includes a pulley of shiftable sections which permit change in the speed ratio between the threshing cylinder and the drive shaft. The pulley is mounted upon members which permit the necessary bodily adjustment of the pulley for the required change in speed.

The intention is to limit the invention only within the terms of the appended claims.

What is claimed is:

1. A thresher construction comprising a thresher part including thresher mechanism, an axle therefor, a source of power, a variable speed driving connection between the source of power and the thresher mechanism comprising a pulley formed of three sections of which the two outer sections are fixed against relative movement and are movable with respect to the middle section, and means for varying the position of the pulley, comprising a first member supporting the pulley at one end, a bracket secured to the axle and comprising a pair of spaced portions each having an elongated slot and embracing the other end of the first member, a second U-shaped member embracing the spaced portions of the bracket, a pin connecting the U-shaped member and the said other end of the first member and passing through the slots in the bracket, an adjusting screw threaded through the base of the U-shaped member and contacting the bracket, a third member pivoted at one end on the draw frame and having spaced portions embracing a mid-portion of the first member and each having an elongated slot, a fourth U-shaped member embracing the third member, a pin connecting the first and fourth members and passing through the slots in the third member, and an adjusting screw threaded through the base of the fourth U-shaped member and connected to the third member.

2. A thresher construction comprising an axle and a thresher part including thresher mechanism, a source of power, a variable speed driving connection between the source of power and the thresher mechanism comprising a pulley formed of three sections of which the two outer sections are fixed against relative movement and are movable with respect to the middle section, and means for shifting the pulley, comprising a first member supporting the pulley at one end, a second member pivotally connected to the other end of the first member by means of a pin, a third member secured to the axle and having an elongated slot receiving the pin, means acting between the second and third members to shift the position of the pin in the slot and thereby to shift the first member, a fourth member pivoted on the frame and having an elongated slot, a pin extending through the slot and the first member, and means for shifting the position of the pin in the slot so as to adjust the first member.

3. A thresher construction comprising a thresher part including a cylinder and other thresher mechanism, an axle supporting the draw frame, a drive shaft mounted on the draw frame, and a variable speed transmission device connecting the drive shaft and the cylinder including an adjustable pulley, a member supporting the pulley at one end, means pivotally and shiftably connecting the other end of the member and the axle, means acting between the axle and the said other end of the member for shifting the member, and means acting between the draw frame and the member for pivoting the member.

ALBERT B. WELTY.